(12) United States Patent
Kress (10) Patent No.: US 8,393,832 B2
(45) Date of Patent: Mar. 12, 2013

(54) TOOL FOR THE MACHINING OF WORKPIECES

(75) Inventor: Dieter Kress, Aalen (DE)

(73) Assignee: Mapal Fabrik fur Prazisionswerkzeuge Dr. Kress KG, Aalen (DE)

( * ) Notice: Subject to any disclaimer, the term of this patent is extended or adjusted under 35 U.S.C. 154(b) by 481 days.

(21) Appl. No.: 12/746,053

(22) PCT Filed: Dec. 4, 2008

(86) PCT No.: PCT/EP2008/010261
§ 371 (c)(1),
(2), (4) Date: Jun. 3, 2010

(87) PCT Pub. No.: WO2009/071288
PCT Pub. Date: Jun. 11, 2009

(65) Prior Publication Data
US 2010/0260558 A1  Oct. 14, 2010

(30) Foreign Application Priority Data

Dec. 6, 2007   (DE) .......................... 10 2007 060 498
Dec. 20, 2007  (DE) .......................... 10 2007 063 204

(51) Int. Cl.
*B23D 77/00*  (2006.01)
(52) U.S. Cl. ......... 408/227; 408/233; 408/713; 408/199
(58) Field of Classification Search .................... 407/11; 408/227, 229, 231, 233, 713, 199, 200, 145, 408/57, 59; *B23D 77/02, 77/00*
See application file for complete search history.

(56) References Cited

U.S. PATENT DOCUMENTS 313,405  A  *  3/1885  Davis ............................... 408/59
864,144  A  *  8/1907  Broadbooks .................... 112/71
(Continued)

FOREIGN PATENT DOCUMENTS

DE       3612180 A1    10/1987
DE       4343404 A1     6/1995
(Continued)

OTHER PUBLICATIONS

English Translation of the International Preliminary Report on Patentability (Ch. II), IPEA/EP, mailed Oct. 7, 2010.
International Search Report for PCT/EP2008/010261, ISA/EP, Rijswijk, NL, mailed May 13, 2009.

*Primary Examiner* — Daniel Howell
*Assistant Examiner* — Ryan Rufo
(74) *Attorney, Agent, or Firm* — Harness, Dickey & Pierce, P.L.C.

(57) ABSTRACT

The invention relates to a tool (1) for machining workpieces, having a base body (3), at least one geometrically defined culling edge (15, 17) on which a face (21) abuts, a chip space (47, 53) associated with the cutting edge for receiving the chips removed by the cutting edge (15, 17), and a chip guide element (27, 29) associated with the cutting edge (15, 17). The tool is characterized in that the cutting edge (15, 17) together with the chip guide element (27, 29) forms a receiving gap (43, 45) which merges into the chip space (47, 53) and into which the chips removed by the cutting edge (15, 17) are introduced, and the chip guide element (27, 29) has a guide surface (39, 41) which, together with the face (21), forms a receiving channel (51) which abuts the receiving gap (43, 45).

18 Claims, 5 Drawing Sheets

U.S. PATENT DOCUMENTS

| | | | |
|---|---|---|---|
| 2,812,791 A * | 11/1957 | Mackey | 408/212 |
| 3,308,689 A * | 3/1967 | MacDonald | 408/204 |
| 3,591,305 A | 7/1971 | Aichhorn et al. | |
| 4,565,473 A * | 1/1986 | Hosoi | 408/229 |
| 4,850,757 A | 7/1989 | Stashko | |
| 5,217,330 A | 6/1993 | Dennstedt | |
| 5,704,735 A * | 1/1998 | Moreau | 407/33 |
| 5,716,169 A | 2/1998 | Scheurfeld | |
| 5,873,683 A | 2/1999 | Krenzer | |
| 5,873,684 A * | 2/1999 | Flolo | 409/66 |
| 6,183,173 B1 | 2/2001 | Ritter | |
| 6,206,618 B1 * | 3/2001 | Ramsey | 408/80 |
| 2003/0082021 A1 | 5/2003 | Minshall | |
| 2005/0129476 A1 | 6/2005 | Kammermeier et al. | |
| 2007/0071561 A1 | 3/2007 | Agic | |
| 2007/0172322 A1 | 7/2007 | Haberle et al. | |
| 2007/0217876 A1 | 9/2007 | Kress et al. | |
| 2008/0069651 A1 | 3/2008 | Kammermeier et al. | |
| 2008/0226402 A1 | 9/2008 | Kammermeier et al. | |
| 2009/0080985 A1 | 3/2009 | Barnthaler et al. | |

FOREIGN PATENT DOCUMENTS

| | | |
|---|---|---|
| DE | 19728384 A1 | 1/1999 |
| DE | 20305081 U1 | 6/2004 |
| DE | 102004008167 A1 | 9/2005 |
| DE | 102005023532 A1 | 11/2006 |
| EP | 1468768 * | 10/2004 |
| GB | 2381767 A | 5/2003 |
| JP | 07164227 * | 6/1995 |
| JP | 11019812 * | 1/1999 |
| JP | 2000-317828 A | 11/2000 |
| WO | WO9614954 A | 5/1996 |
| WO | WO03097283 A | 11/2003 |
| WO | WO2005077575 A | 8/2005 |
| WO | WO2005102574 A | 11/2005 |
| WO | 2006/135946 A1 | 12/2006 |
| WO | 2007/006575 A1 | 1/2007 |
| WO | 2009/030454 A1 | 3/2009 |
| WO | 2009/030455 A1 | 3/2009 |

* cited by examiner

TOOL FOR THE MACHINING OF WORKPIECES

CROSS-REFERENCE TO RELATED APPLICATIONS

This application is a 371 U.S. National Stage of International Application No. PCT/EP2008/010261, filed Dec. 4, 2008. This application claims the benefit of Foreign Patent Applications Nos. DE 10 2007 060 498.1, filed Dec. 6, 2007 and DE 10 2007 063 204.7, filed Dec. 20, 2007, which applications are herein expressly incorporated by reference.

The invention relates to a tool for machining workpieces according to the preamble of claim 1.

Tools of this type are known, and are used, for example, for machining the walls of hollow components. For example, when the walls have a through opening in the machined area, chips removed from the workpiece pass through this opening and into the cavity enclosed by the walls. In many cases, for cast cylinder heads or engine blocks of internal combustion engines, for example, it is relatively complicated to remove the chips from the interior of the workpiece. If the chips are not completely removed, this may result in malfunction of an engine provided with the cylinder head or engine block.

The object of the invention, therefore, is to provide a tool of the aforementioned type which avoids this disadvantage.

This object is achieved by providing a tool having the features stated in Claim 1. This tool has a base body, at least one geometrically defined cutting edge on which a face abuts, and a chip space associated with the cutting edge. This chip space receives the chips removed by the cutting edge. Lastly, the tool is provided with a chip guide element which is associated with the cutting edge, so that chips removed by the cutting edge strike the chip guide element. The tool is characterized in that the cutting edge together with the chip guide element forms a receiving gap, into which the chips removed by the cutting edge are introduced. The chip guide element has a guide surface which, together with the face adjoining the cutting edge, forms a receiving channel. The chips exiting through the receiving gap pass into this receiving channel. The design of the tool which is selected here ensures that chips removed from the cutting edge are guided and diverted in a targeted manner into the receiving gap with the aid of the chip guide element. The chip discharge defined in this manner ensures that chips removed by the cutting edge are not able to pass uncontrolled into the surroundings, i.e., in particular for the machining of a hollow workpiece, into the interior thereof.

One preferred exemplary embodiment is characterized in that the chip space, starting from the receiving gap, is expanded at least in places. This design facilitates the further guiding of produced chips into the chip space, and thus ensures that the chips do not pass back into the machining area and possibly into a cavity of a workpiece.

One particularly preferred exemplary embodiment of the tool is characterized in that the width of the receiving gap is smaller than the diameter of a helical chip produced by the cutting edge. It has been shown that spiral-shaped chips, referred to as "helical chips," are produced during the machining of workpieces. These helical chips are discharged by the active cutting edge of the tool, and in the region of the receiving gap collide with the guide surface of the chip guide element, where they are diverted into the receiving channel. As a result, chips removed from the workpiece surface are guided into the chip space in a targeted manner and are unable to pass back into the machining area.

Further embodiments result from the subclaims.

The invention is explained in greater detail with reference to the drawings, which show the following.

Figure 1:
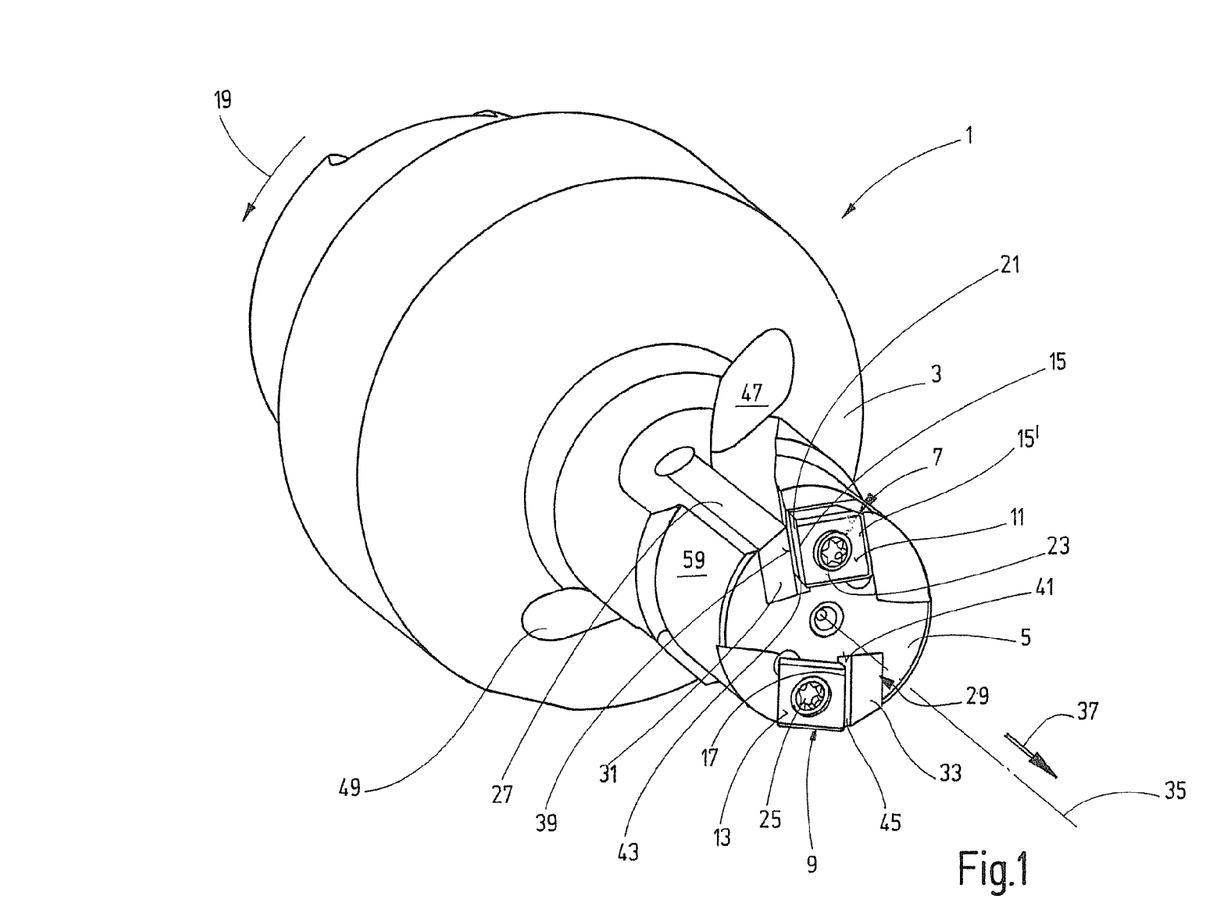
FIG. 1 shows a first exemplary embodiment of a tool for machining workpieces, in a perspective illustration.

FIG. 1 shows a first exemplary embodiment of a tool 1 having a base body 3, which in the present case has different outer diameters strictly by way of example. At least one cutting bit is inserted into the end face 5 facing the observer. In the exemplary embodiment illustrated, two cutting bits 7 and 9 are provided, which in a manner of speaking are tangentially inserted into the end face 5. That is, the front side 11 of cutting bit 7 and the front side 13 of cutting bit 9 facing the observer extend essentially parallel to the end face 5. Cutting bits 7, 9 are actually slightly tilted, so that a border edge of the front side 11 or 13 projects somewhat beyond the end face 5. This border edge forms a geometrically defined cutting edge 15 of cutting bit 7, and a geometrically defined cutting edge 17 of cutting bit 9.

For machining a workpiece the tool 1 is set in rotation, specifically, in the counterclockwise direction as shown in FIG. 1. This is indicated by an arrow 19. In principle, the workpiece may also be moved with respect to a stationary tool. The critical factor is the relative motion between the workpiece and the cutting edge 15 or 17.

Thus, during the rotary motion of the tool 1 chips are removed by cutting edges 15 and 17, and are discharged on a face which abuts the cutting edges. The face 21 associated with cutting edge 15 may be seen in FIG. 1.

In the exemplary embodiment illustrated, the face 21 is tilted about cutting edge 15; i.e., the face defines an angle <90° with respect to the front side 11 of cutting bit 7. Such a design is referred to as a "positive rake angle."

The face associated with the cutting edge 17 of cutting bit 9 is not visible in the illustration according to FIG. 1.

In the exemplary embodiment illustrated, the cutting bits of the tool 1 have a quadrilateral design by way of example. The cutting bits may be turned about the center axis of a clamping screw when a cutting edge becomes worn.

A clamping screw 23 which is countersunk in the front side 13 of cutting bit 7 is associated with cutting bit 7. Similarly, a clamping screw 25 which is countersunk in the front side 13 of cutting bit 9 is associated with cutting bit 9.

In principle, it is also possible to carve out cutting edges 15 and 17 in question directly from the base body of the tool 1. However, it is more economical, as described here, to use cutting bits 7, 9 having corresponding cutting edges 15, 17.

A chip guide element 27 is associated with cutting bit 7 at a distance therefrom; a chip guide element 29 is correspondingly associated with cutting bit 9. The chip guide elements 27 and 29 are designed as strips which are countersunk in the base body 3. The chip guide elements are suitably affixed, preferably hard-soldered. They may also be anchored in the base body 3 of the tool 1 using screws or clamps.

The chip guide elements 27 and 29 have a front side 31, 33, respectively, which in the present case is in flush abutment with the end face 5 of the tool 1 by way of example. Viewed in the direction of the center axis 35 of the tool 1 and in the direction of the feed direction indicated by a double arrow 37, cutting edges 15 and 17 lead with respect to the front sides 31 and 33 of chip guide elements 27 and 29. In any event, it is essential that cutting edges 15 and 17 project farther beyond the end face 5 of the tool 1 than the front sides 31 and 33. In particular, the axial distance between a plane extending through cutting edges 15 and 17, parallel to the end face 5, and a plane defined by the front sides 31 and 33 of chip guide elements 27 and 29 must be greater than the advance which the tool 1 undergoes during one revolution relative to the workpiece.

In one particularly preferred embodiment of the tool 1, it is provided that the axial distance between the planes in which cutting edges 15 and 17 and the front sides 31 and 33 of chip guide elements 27 and 29 are situated is in a range from $\geq 0.2$ mm to 0.6 mm. In other words, viewed in the feed direction, the cutting edges lead in front of the front sides by $\geq 0.2$ mm to 0.6 mm. A leading of 0.4 mm is particularly preferred. These values apply for a feed rate of 0.2 mm per revolution of the tool 1.

The values given here for the leading of the cutting edges with respect to the front sides of the chip guide elements are selected for a tool 1 which has two cutting edges. However, if only one cutting edge should be present, the leading must be selected to be twice this value.

A guide surface 39 is provided on the side of the chip guide element 27 facing cutting bit 7. Correspondingly, chip guide element 29 has a guide surface 41 on its side facing cutting bit 9.

Between the cutting edges 15 and 17 of the cutting bits and the associated chip guide elements 27 and 29, a receiving gap 43, 45 is respectively formed, into which chips removed by cutting edges 15 and 17 enter.

In one preferred exemplary embodiment of the tool 1 it is provided that the width of the gap (measured in the circumferential direction 19), i.e., the distance between cutting edges 15 and 16 of the cutting bits and the chip guide elements 27 and 29, is in a range from 0.6 mm to 1.0 mm. A width of 0.8 mm is particularly preferred.

It is also shown in FIG. 1 that a chip space 47 is introduced in the base body 3 of the tool 1 which accommodates the chips removed by the cutting edge 15. Correspondingly, a chip space is associated with the cutting edge 17 of cutting bit 9, of which only a discharge area 49 is visible here.

Figure 2:
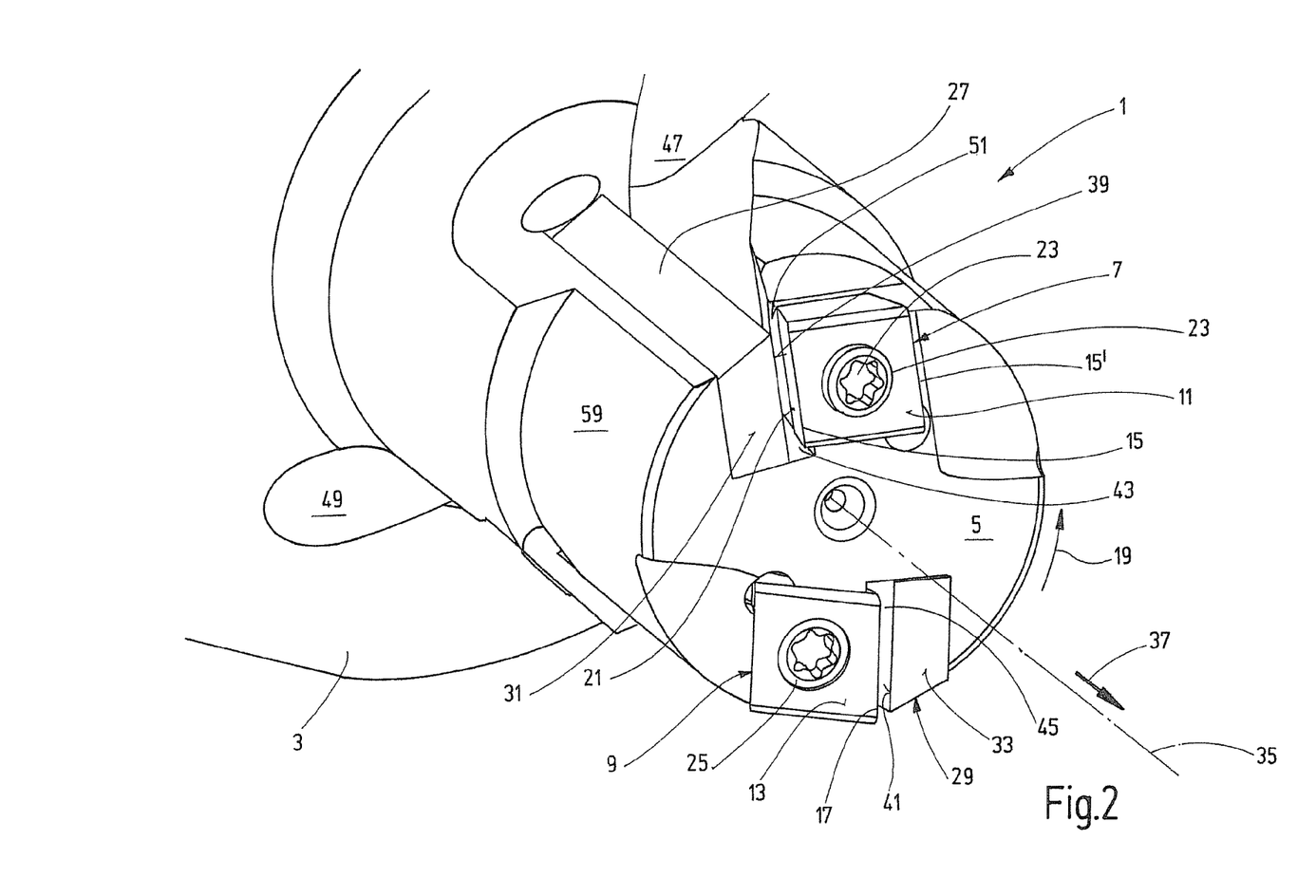
FIG. 2 shows an enlarged detailed view of the tool illustrated in FIG. 1.

FIG. 2 shows the front section of the tool 1 as illustrated in FIG. 1. Identical and functionally equivalent parts are provided with the same reference numerals, so that in this regard reference is made to the description for FIG. 1.

FIG. 2 shows once again that the tool 1 is provided with two cutting bits 7 and 9 by way of example. These cutting bits are tightened, essentially opposite one another in the end face 5 of the tool 1, by means of the clamping screws 23 and 25 described above. The following description concerns only the upper cutting bit 7 in FIG. 2. All statements in this regard correspondingly apply to the lower cutting bit 9.

The enlarged view clearly shows that cutting edge 15 forms the intersection line between the front side 11 and the face 21 of cutting bit 7. The cutting edge is situated at a distance from the guide surface 39 of the chip guide element 27, and preferably extends essentially parallel thereto, so that in this case the receiving gap 43 is formed with parallel border lines.

The face 21 preferably defines an acute angle with respect to the guide surface 39, the angle opening toward the chip space 47, starting from the receiving gap 43. A receiving channel 51 is thus formed between the face 21 and the guide surface 39, in which the chips removed by cutting edge 15 and guided through the receiving gap 43 are received. From the receiving channel 51 the chips exit into the further chip space 47.

The chip guide element 27 is situated with respect to cutting bit 7 in such a way that the course of the chips removed by the cutting edge 15 is influenced in a defined manner: the chips collide with the guide surface 39 of the chip guide element 27. The chip guide element is situated close enough to cutting bit 7, i.e., the receiving gap 43 has such a narrow design, that the chips collide with the guide surface 39 and are guided by same into the receiving channel 51, and from there into the chip space 47. It is known that a chip produced by a cutting edge on the face 21 is basically discharged to the rear, i.e., opposite the feed direction. The chip has the tendency to separate from the face and form a curl. In practice it has been shown that this curl is able to migrate in the feed direction and protrude in an uncontrolled manner beyond the end face 5 of the tool 1. Use of the chip guide element 27 ensures that the curls are diverted to the rear, i.e., opposite the feed direction, and are thus guided into the receiving channel 51.

This targeted influencing of the chip discharge ensures that chips removed by the cutting edge 15 are not discharged in the feed direction indicated by the arrow 37, but instead are diverted opposite the feed direction and reliably guided into the chip space 47.

With reference to FIG. 2, it is noted once again that the width of the receiving channel 51, i.e., the distance of the cutting edge 15 and the associated face 21 from the chip guide element 27 or the guide surface 39 thereof, is selected in such a way that chips removed from the workpiece are captured in the receiving gap 43 and receiving channel 51 and diverted into the chip space 47.

When the tool 1 is used for machining openings in walls of a workpiece which enclose a cavity, the targeted influencing of the chip discharge ensures that during machining of the workpiece no chips pass into the cavity thereof and impair the function of the workpiece itself or related elements. In addition, after machining a hollow workpiece there is no need for complicated cleaning operations, since the chips removed from the tool 1 are reliably diverted from the machining area and guided in a targeted manner into the chip space 47.

This is advantageous, for example, in the production of machined seats, commonly known as "water plug holes," for the closure caps of coolant circuits or water circuits in engine blocks or cylinder heads.

Figure 3:
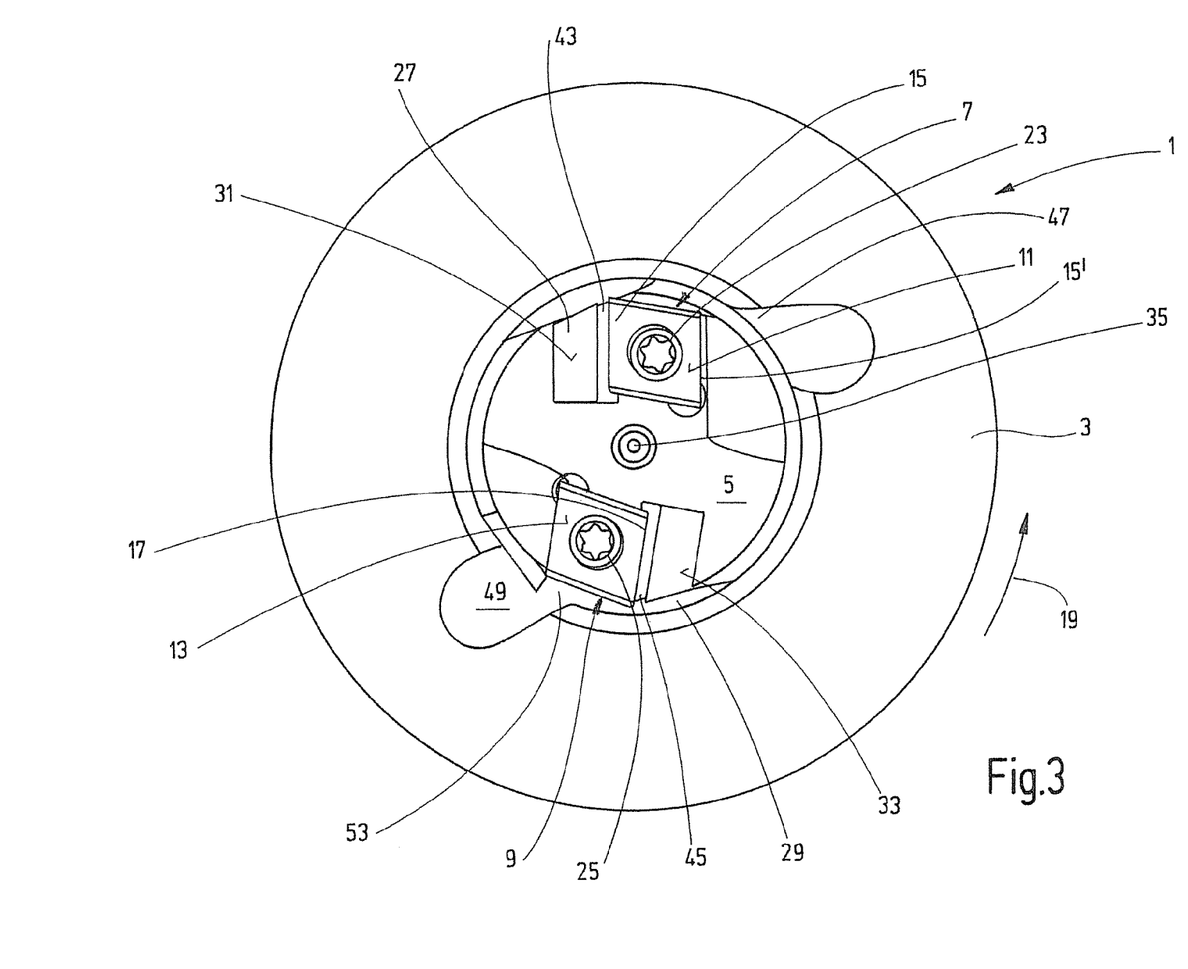
FIG. 3 shows an end face view of the tool according to FIG. 1.

FIG. 3 shows the tool, explained with reference to FIGS. 1 and 2, in a top view. Identical and functionally equivalent parts are provided with the same reference numerals, so that in this regard reference is made to the description for FIGS. 1 and 2.

The tool 1 has a symmetrical design. Cutting bit 9 is situated opposite from cutting bit 7. The cutting bits are tightened by clamping screws 23 and 25 in the base body 3 of the tool 1. Symmetrical chip spaces are associated with the cutting bits, chip space 47 being associated with cutting bit 7, and chip space 53 being associated with the discharge area 49 of cutting bit 9.

From this perspective it may be clearly seen that a receiving gap 43 and 45 is respectively provided between cutting bits 7 and 9 and associated chip guide elements 27 and 29, into which the chips removed by the cutting edges 15 and 17 enter and are discharged perpendicularly into the image plane of FIG. 3.

The cutting edges 15 and 17 of cutting bits 7 and 9 end at a distance from the center axis 35 of the tool 1. Thus, the tool is designed only to machine a workpiece having an existing borehole. Machining into solid material is therefore not possible.

Figure 4:
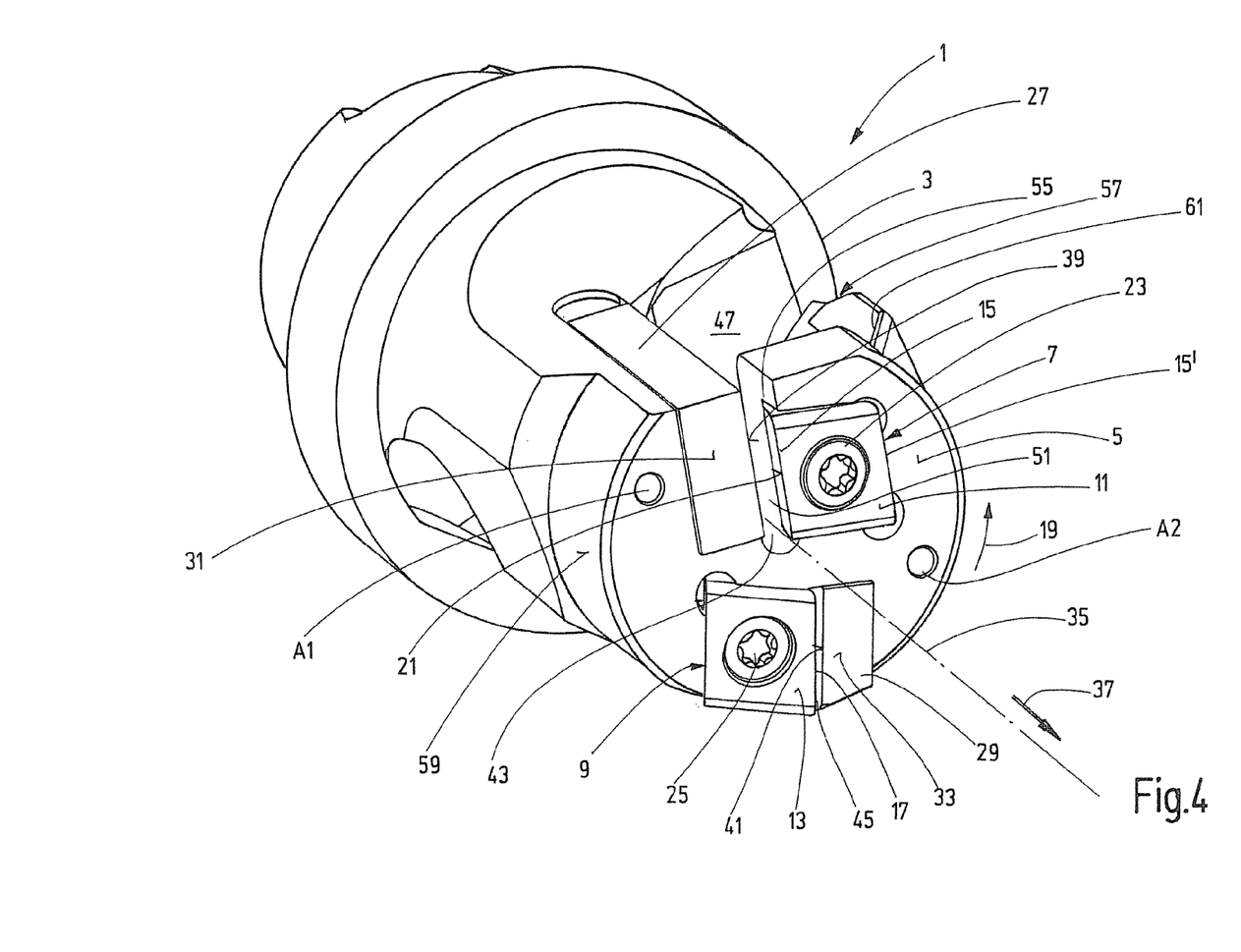
FIG. 4 shows a perspective front view of a second exemplary embodiment of a tool.

FIG. 4 shows a modified exemplary embodiment of the tool 1. Identical and functionally equivalent parts described with reference to the first exemplary embodiment are provided with the same reference numerals. In this regard, reference is made to the preceding figures.

The tool 1 has a base body 3, in the end face 5 of which two cutting bits 7 and 9 are once again countersunk practically tangentially, so that the respective front sides 11 and 13 of the cutting bits extend essentially parallel to the end face 5. This illustration clearly shows that an angle <90° is in fact defined between the front side 11 and the face 21 of cutting bit 7. Cutting bit 7 is accommodated in a recess 55 in the base body 3 of the tool 1, the base of the recess being inclined relative to the end face 5 in such a way that the cutting edge 15 of cutting bit 7 projects farther beyond the end face 5 than the oppositely situated border edge 15' of cutting bit 7. As stated, cutting bit 7 is designed as an indexable insert. It is also possible to loosen the clamping screw 23 and turn the cutting bit about the center axis of the clamping screw so that the border edge 15' of the clamping screw contacts the location of the cutting edge 15, and is thus able to act as an active cutting edge.

From the illustration according to FIG. 4 showing the tool 1 in a perspective front view, it can be seen that the cutting bit 9, in this case on the bottom, is situated at the outside edge of the end face 5, while cutting bit 7 is situated in such a way that its cutting edge 15 extends to the center axis 35 of the tool 1. Together, the cutting edge 15 of cutting bit 7 and the cutting edge 17 of cutting bit 9 cover a working area which allows use of the tool 1 for machining into solid material.

The exemplary embodiment of the tool 1 illustrated here has an additional cutting bit 57 which is inserted into the circumferential surface 59 of the base body 3 of the tool 1 adjacent to the end face 5, and has a cutting edge 61 with which a bevel, for example, may be produced or machined. For this purpose the cutting edge 61 projects beyond the circumferential surface 59.

The remaining design of the tool 1 according to FIG. 4 essentially corresponds to the exemplary embodiment according to FIGS. 1 through 3. Thus, here as well it is provided that a receiving gap 43 is formed between the cutting edge 15 of cutting bit 7 and the guide surface 39 of the chip guide element 27, into which chips which are removed by the cutting edge 15 enter and are guided via a receiving channel into the chip space 47.

A corresponding receiving gap 45 is formed between cutting bit 9 and the chip guide element 29.

It may be clearly seen that the width of receiving gap 43 is greater than the width of receiving gap 45. The gap width is adjusted to the chips removed by the respective cutting edges 15 and 17. The defined width of the receiving gaps 43 and 45 ensures that no chips exit in the direction of the feed direction denoted by double arrow 37 during machining of a workpiece.

For the machining of a workpiece, the relative speed between the workpiece surface and cutting edge 17 is greater than that between the workpiece surface and cutting edge 15. Thinner chips are therefore removed by cutting edge 17, which roll up in a spiral fashion during discharge from cutting edge 17, resulting in so-called helical chips.

During machining of a workpiece, the cutting edge 15 of cutting bit 7 situated farther from the center axis 35 has a lower relative speed compared to cutting edge 17, so that at this location thicker chips are removed, which are rolled up into helical chips having a larger diameter.

Matching the width of receiving gaps 43 and 45 specifically to the helical chips ensures that chips removed by the cutting edges are forced through receiving gaps 43 and 45 and the associated receiving channels, and into the respective chip spaces 47 and 53. Thus, even for machining into solid material it is ensured that no chips exit to the front in the feed direction via the end face 5. If a borehole is produced and machined in the wall of a hollow workpiece, when the tool 1 passes through the wall no chips pass into the cavity in the workpiece enclosed by the wall.

Thus, it is ensured that the advantages resulting from the exemplary embodiment of the tool 1 explained according to FIGS. 1 through 3 are also realized for this embodiment of the tool 1 illustrated in FIG. 4.

A coolant/lubricant supply is provided in the exemplary embodiment of the tool 1 illustrated in FIG. 4. The appropriate medium is conveyed through the base body 3 of the tool 1 into the region of the active cutting edges. Shown by way of example in FIG. 4 are outlet openings A1 and A2, from which the coolant/lubricant exits during use of the tool 1. It may be seen that in this case the outlet openings A1 and A2 open into the end face 5 of the tool 1. An outlet opening may also be associated with the cutting bit 57 so that this cutting bit as well may be supplied with coolant/lubricant.

Figure 5:
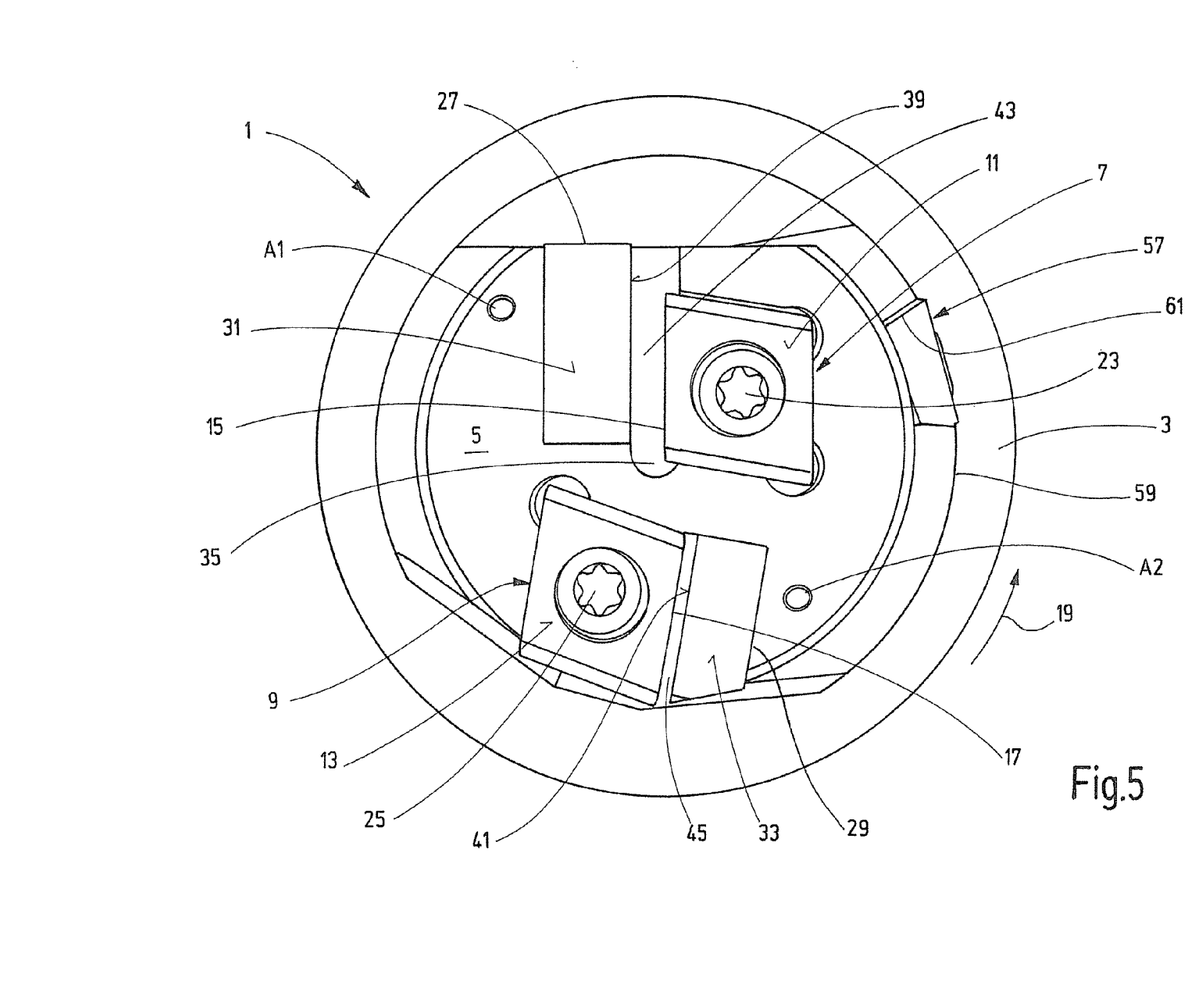
FIG. 5 shows an end face view of the tool according to FIG. 4.

Lastly, FIG. 5 shows the tool 1 illustrated in FIG. 4 in an end face view. Identical and functionally equivalent parts described with reference to FIGS. 1 through 4 are provided with the same reference numerals. In this regard, reference is made to the description for the preceding figures.

In this case it is once again clear that the distance of cutting bit 7 from the associated chip guide element 27 is greater than the distance of cutting bit 9 from the associated chip guide element 29. Thus, the receiving gap 43 in the region of the first cutting bit 7 is wider than the receiving gap 45 in the region of the second cutting bit 9.

The illustration according to FIG. 5 also shows that the third cutting bit 57, the same as cutting bits 7 and 9, is tangentially inserted into the outer face of tool 1, and in the present case is inserted into the circumferential surface 59 of the base body 3.

From the explanations for FIGS. 1 through 5 it is clear that the tool 1 described here is characterized in that chips, in particular the helical chips, removed by the at least one cutting edge, in the present case by cutting edges 15 and 17, are not discharged in the direction of the feed direction indicated by the double arrow 37, but instead are captured in the associated receiving gaps 43 and 45 and pass via receiving channels into the chip spaces of the cutting bits. It is also shown that the design of the tool is relatively simple, resulting in cost-efficient implementation of the object stated herein.

To reduce the wear on the chip guide elements 27 and 29, at least the respective guide surface 39, 41 thereof which faces cutting bits 7, 9 and on which the chips removed by cutting edges 15, 17 are discharged are coated with a resistant material, whether hard metal or PCD. The chip guide elements 27 and 29 are preferably composed entirely of hard metal. The chip guide elements are soldered into the base body 3 of the tool 1 or affixed in some other suitable manner.

It is further noted that the tool 1 may be provided with at least one guide strip, at least in the circumferential region adjoining the end face 5, by means of which the tool is supported on the machined or produced borehole wall during machining of a workpiece.

On its exterior with which it comes into contact with the workpiece the at least one guide strip is coated with a hard material such as PCD, for example, and is preferably composed entirely of PCD. The guide strip is glued into the base body 3 of the tool 1, or is affixed thereto in some other suitable manner.

An adjusting device is preferably provided to ensure an optimal width of the receiving gaps 43, 45. This adjusting device may act on the chip guide elements 27 or 29, but preferably acts on cutting bits 7 and 9. It is also possible to provide both parts with adjusting devices in order to influence the width of the receiving gap.

Lastly, the tools 1 may be provided with a coolant/lubricant feed line via which coolant/lubricant enters the machining area of the cutting edges. With regard to the cutting edges 15 and 17 of cutting bits 7 and 9, it is important that these are situated in the region of the receiving gap 43, 45. The receiving gaps are adjoined by a preferably expanding receiving channel 51 which merges into the associated chip space. Since the receiving gap is the narrowest region into which the chips removed by the cutting edges 15 and 17 enter, at this location this results in a maximum flow rate of the coolant/lubricant, so that the targeted diversion of the chips from the cutting edges 15 and 17 into the associated chip space is facilitated.

It is clear from the present discussion that the tool 1 may be provided with one or also more than two cutting edges. It is also obvious that a receiving gap for the targeted diversion of the chips from a workpiece may also be provided in the circumferential region of a tool.

The invention claimed is:

1. A tool for machining workpieces, comprising:
    a base body;
    at least one geometrically defined cutting edge on which a face abuts;
    a receiving gap which merges into a chip space associated with the cutting edge for receiving the chips removed by the cutting edge;
    a receiving channel which abuts the receiving gap; and
    a chip guide element associated with the cutting edge, the chip guide element designed as a strip countersunk in the base body;
    wherein the cutting edge and the chip guide element cooperate to form the receiving gap into which the chips removed by the cutting edge are introduced, and the chip guide element has a guide surface which, together with the face, forms the receiving channel.

2. The tool according to claim 1, wherein the chip space, starting from the receiving gap, is expanded at least in places.

3. The tool according to claim 1, wherein the face and the guide surface form an acute angle with respect to one another which increases toward the chip space, starting from the receiving gap.

4. The tool according to claim 1, wherein a width of the receiving gap is smaller than a width of the adjacent chip space.

5. The tool according to claim 1, wherein there is an axial distance between a plane extending through the cutting edges, parallel to the end face, and a plane defined by the front sides of the chip guide elements, and the cutting edges project farther beyond the end face than the front sides of the chip guide elements.

6. The tool according to claim 1, wherein a width of the receiving gap is in a range of 0.6 mm to 1.0 mm.

7. The tool according to claim 1, wherein a width of the receiving gap is approximately 0.8 mm.

8. The tool according to claim 1, wherein the at least one cutting edge is part of a cutting bit.

9. The tool according to claim 8, wherein the cutting bit may be tangentially inserted into the end face of the tool.

10. The tool according to claim 8, further comprising an adjusting device which cooperates with the at least one cutting bit or the associated chip guide element.

11. The tool according to claim 10, wherein a width of the receiving gap may be adjusted using the adjusting device.

12. The tool according to claim 1, wherein the strip is at least partially constructed of a hard metal.

13. The tool according to claim 1, wherein the guide surface of the chip guide element has a coating made of PCD.

14. The tool according to claim 1, wherein the chip space extends along an imaginary helix.

15. The tool according to claim 1, wherein at least one guide strip is provided.

16. The tool according to claim 15, wherein the guide strip is at least partially constructed of PCD.

17. The tool according to claim 1, further comprising a coolant/lubricant supply having at least one coolant/lubricant channel.

18. The tool according to claim 17, wherein the at least one coolant/lubricant channel of the coolant/lubricant supply opens into the end face of the tool.

* * * * *